United States Patent [19]

Ristin et al.

[11] Patent Number: 5,074,265

[45] Date of Patent: Dec. 24, 1991

[54] ROTARY VALVE WITH FACILITY FOR STRATIFIED COMBUSTION IN THE INTERNAL COMBUSTION ENGINE

[76] Inventors: George Ristin, 35 Swordbill Drive, Unit 11, Etobicoke, Ontario, Canada, M9A 4V3; Vojislav Milosavljevic, 25 Parkway Forest Drive, Unit 1101, North York, Ontario, Canada, M2J 1L4

[21] Appl. No.: 540,704

[22] Filed: Jun. 20, 1990

[30] Foreign Application Priority Data

Jun. 23, 1989 [CA] Canada ................................ 603711

[51] Int. Cl.$^5$ .............................................. F02B 19/02
[52] U.S. Cl. .................................. 123/292; 123/264; 123/190 BD
[58] Field of Search ............... 123/260, 261, 264, 275, 123/286, 292, 190 B, 190 BB, 190 BD, 190 BE, 190 C

[56] References Cited

U.S. PATENT DOCUMENTS

| | | | |
|---|---|---|---|
| 2,614,546 | 10/1952 | Schwarz | 123/292 X |
| 3,730,161 | 5/1973 | Deane | 123/190 BD |
| 3,906,922 | 9/1975 | Dane, Jr. | 123/190 B |
| 3,911,878 | 10/1975 | Hofbauer et al. | 123/292 X |
| 4,481,917 | 11/1984 | Rus et al. | 123/190 B |
| 4,817,388 | 4/1989 | Bland | 123/292 X |

FOREIGN PATENT DOCUMENTS

2530837 1/1977 Fed. Rep. of Germany ...... 123/292

*Primary Examiner*—Willis R. Wolfe

[57] ABSTRACT

A coaxial rotary valve mechanism for an internal combustion engine that incorporates two coaxial, cylinder shaped rotors in the cylinder head, rotating with speed ratio of 2:1 so that ports in their surfaces align at the appropriate segments of the operating cycle to function as air intake valves. The outer rotor further comprises a recess on its surface which has plurality of functions. During the compression stroke said recess forms a pre-combustion chamber between said rotor and the cylinder head, and during the exhaust stroke brings the cylinder into the open registry with the exhaust port allowing combustion gases to be exhausted. During the compression stroke the liquid fuel is injected into the pre-combustion chamber containing exhaust gases, while said pre-combustion chamber is in closed registry with the cylinder. The air inlet is restricted during the injection and as the outer rotor progresses with its rotation a swirl of compressed air is allowed into the pre-combustion chamber only prior to the ignition. Stratified combustion of the fuel charge has two stages. In firs stage, part combustion takes place in the pre-combustion chamber, where burning mixture increases the pressure, which in the second stage injects unburned portion of the charge into the main-chamber, containing compressed air only, for total combustion. The stratified combustion lowers the combustion temperature which in return reduces the content of major pollutants in the exhaust gases.

4 Claims, 6 Drawing Sheets

ROTARY VALVE WITH FACILITY FOR STRATIFIED COMBUSTION IN THE INTERNAL COMBUSTION ENGINE

BACKGROUND OF THE INVENTION

It is accepted that rotary valves for internal combustion engines are more cost effective, easier to assemble and maintain and, for some proposed designs, even surpass the dependability and durability of poppet valves.

An imperative of a modern high speed engine design is to provide sufficient air for complete combustion under all operating conditions, which will result in cleaner emissions and improved fuel economy. However, this requirement imposes compromises in the design.

These compromises are presently achieved through the use of a large number of components, most of which operate in a reciprocating mode and therefore impose problems due to their inertia. A common design approach is to use multiple smaller and lighter valves. This, however, means a reduction in individual port size and an associated increase in air flow constrictions. Furthermore, the valve inertia, a major limitation in the retraction speed of poppet valves, is addressed only through a reduction of the valve mass. In consequence, a rotary valve system appears to be the only alternative solution for the above problems.

In addition, the conventional, carburetted stratified charge engine design calls for a separate pre-combustion chamber, in which the rich air/fuel mixture is burned (e.g., the Honda CVCC type). This feature, added to the already mentioned multiple valve design and related camshaft and timing mechanisms, results in an extremely complex cylinder head design.

The requirement for a separate pre-combustion chamber may be partially obviated by the use of a diesel-type open chamber direct fuel injection (e.g., the Ford PROCO type). However, there are remaining difficulties which stem principally from free communication between the cylinder chamber and the pre-combustion chamber during the compression stroke. This free communication dilutes the charge in the pre-combustion chamber thereby reducing the power output and the fuel efficiency.

These problems have contributed to the general lack of acceptance of the conventional pre-ignition and stratified engines.

Various apparatuses and arrangements have been suggested to utilise the above mentioned advantages. Some of those were very elaborate, resulting in rather complex and questionable designs.

In most of rotary valve internal combustion engines the air/fuel mixture was fed through a conduit in the rotary valve body, which was used as a communication port between an intake manifold and the cylinder chamber. The combustion products were exhausted through the same or a different passage in said valve body into the exhaust manifold. In same engines the same conduit was used for pre-combustion chamber functions creating problems related to its size, since it had to be large enough not to impose constriction for intake air.

Up to the present time, proposed inventions have not addressed the possibility of using a recess in the rotary valve body for the pre-combustion chamber functions.

It is therefore the object of this invention to show that such function is achievable.

SUMMARY OF THE INVENTION

The invention relates to an internal combustion engine with a valve system comprising rotary sleeves, from now on called rotors. The valve system consists of two coaxially arranged rotors with ports in their surfaces that function as intake valves. The capability to accommodate stratified combustion is achieved through a pre-combustion chamber, which is a recess on the outer rotor body.

The rotors are synchronized with the crankshaft but rotate at different angular speeds. Namely, the inner rotor rotates at the same angular speed as the crankshaft, while the outer rotor runs at one-half the crankshaft angular speed. This is done in order to prevent free communication between the intake duct and the exhaust manifold. It is appropriate to add at this point that the proposed design can be simplified for a single cylinder engine. The need for an inner rotor, which functions as a valve that prevents free communication of the exhaust gases between adjacent cylinders, does not exist for a single cylinder design. The same situation is present in a boxer type design for four cylinder engines, since adjacent cylinders are in opposite phase. While one intake port is in closed registry with the exhaust port, another intake port of the same rotor is in open registry with the cylinder chamber. This further simplifies the proposed design by eliminating the need for the inner rotor drive mechanism.

The primary objective of the invention is to provide a stratified combustion in an internal combustion engine. Other objectives of the invention are:

to provide highly balanced valves which can be run at very high speed;

to provide a simple and improved design of the rotary valves through their coaxial arrangement;

to provide cleaner exhaust gas emissions through controllable combustion over a wide range of engine load and speed;

to improve the thermal efficiency of the engine through better control of the combustion temperature;

to increase the engine volumetric efficiency by minimizing the restriction of the flow of the air into the cylinder chamber caused by the poppet valves and throttling.

Additional objectives and advantages of the invention will become more apparent hereinafter.

In the conventional internal combustion engine, the temperature of the burning gases undergoes a rapid increase to a peak value and immediately falls off to a low value. The short duration of high burning temperature causes oxides of nitrogen ($NO_x$) to be formed. Other principal pollutants, i.e., unburned hydrocarbons (HC) and carbon monoxide (CO), are the results of incomplete combustion. Incomplete combustion is related to the incapability of conventional internal combustion engines to maintain the ideal (stoichiometric) air/fuel mixture for all engine load conditions.

Compared with a conventional internal combustion engine, the slowly propagating flame, produced by the stratified combustion, achieves temperatures above the minimum hydrocarbons combustion temperature, but below that required to produce $NO_x$. The combustion is completed in an atmosphere sufficiently rich in oxygen to oxidize HC and CO. The resulting cleaner combustion emission obviates the need for expensive and complicated emission control systems.

Stratification of the combustion in this invention is achieved through the design and arrangement of a pre-combustion chamber and main-chamber. Said pre-combustion chamber is formed between a recess in the outer rotor and the rotor housing in the cylinder head when the engine is in the compression stroke.

The design provides a small passage in the leading surface of the recess of the outer rotor which acts as an iris, that opens prior to the ignition, so that a small amount of air is forced into the pre-combustion chamber in a swirling motion during the compression stroke. Since the fuel has already been injected into the pre-combustion chamber, the ignition takes place.

With a limited amount of air in the pre-combustion chamber only a part of the fuel burns. This results in a pressure rise in the pre-combustion chamber which forces the rest of the fuel, in the form of a hot burning jet at sonic velocity, into the main-chamber trough the passage of the recess. Here it mixes with the remaining air and is completely burned.

Since the fuel is injected into the pre-combustion chamber at the low pressure of the residual gases, the fuel pressure required for this type of injection can be much lower than in diesel fuel injection. In the Diesel type engine the fuel is injected into the main-chamber and must overcome the high cylinder compression pressure. The injection can also be operated with a coarser spray, since complete evaporation of the fuel is achieved through its contact with the hot walls of the recess.

The expansion of the burning jet has a beneficial effect on the thermal efficiency of the process. Through expansion, the burning temperature is lowered, resulting in a reduction of the degree of dissociation. Thus, more chemical energy appears as internal energy thereby increasing the thermal efficiency of the process.

Due to the design of the pre-combustion chamber, complete evaporation of the fuel charge is accomplished by injection onto the hot walls of the recess. Further, the swirling air, which enters the pre-combustion chamber prior to ignition, yields a totally homogeneous mixture of air and fuel charge.

The proposed engine is able to operate at an appreciably higher compression ratio than conventional gasoline internal combustion engines because of two factors. First, the atmosphere in the mainchamber contains no fuel, or very little of it, during the compression stroke that could be autoignited. Therefore the charge can be compressed to a much greater degree than the air/fuel charges of the conventional engine. Second, the "flame front" expansion, which starts in the pre-combustion chamber, compresses the unburned fraction ahead of it into the pure air or a very lean mixture (the latter only during the worm-up period) of the main-chamber which can not autoignite. In this respect, the proposed engine design achieves, for a gasoline engine, some of the advantages of the Diesel type engine.

Also mimicking a diesel, the engine's output is controlled by the amount of fuel injected into the pre-combustion chamber, only in amounts sufficient to meet the load demand of the engine, not by how much air is admitted through a throttle plate. In conventional gasoline engines the output is controlled by throttling. At anything less than full throttle (maximum engine output), the butterfly valve of the throttle has to be partly closed to reduced the air to match the reduced fuel so that correct stoichiometric air/fuel mixture can be maintained. This cuts off the engine's working fluid, i.e., air, which has detrimental effect on the efficiency, as well as on the emission of HC and CO. And it is the part-throttle condition that prevails during the greatest part of engine's operating life. During the part-throttle condition an extra fuel charge must be supplied simply to support the spark, thereby decreasing engine efficiency even more. The need for a relatively rich mixture, and the difficulty associated with homogenizing the same, restricts the size of individual cylinder chambers in spark-ignited gasoline engines. Therefore, in the past the advantages of large cylinder chamber designs were restricted to Diesel engines.

In this invention no throttling is necessary to control the air/fuel ratio, since the ignition occurs in a prechamber, and in an atmosphere always rich enough to support the spark. Therefore all design problems, associated with throttling are eliminated.

Absence of the power control by throttling contributes to the total efficiency of the proposed engine by reducing the work needed to overcome constrictions and the "pumping work" they would impose.

Further, it is evident from the design of the pre-combustion chamber, that the combustion process starts in it as a constant volume process and continues in the main-chamber as a constant pressure process. The ratio between the heat released under the constant volume process and the heat released under the constant pressure conditions determines the thermal efficiency of the proposed engine. In the proposed design, this ratio depends upon the shape of the leading surface of the recess and the surface to volume ratio between the pre-combustion chamber and the main-chamber.

From the above we conclude that the objectives set by the invention are accomplished and in addition the following have been achieved:

Full breathing without throttle constriction;
Power control by fuel metering only;
Positive ignition without reliance on the air/fuel mixture or the autoignition properties of specific fuels.

There are a number of parameters in this design which may be varied to achieve optimum performance, including:

the shape of the pre-combustion chamber and main-chamber as well as their surface to volume ratio;
the shape of the leading surface of the outer rotor recess;
the injector location and the angle of the inclination;
the spark plug location, but further discussion along this lines is beyond the scope of this invention.

The above mentioned variables give a much greater flexibility in the way the combustion process may be controlled than is possible in the conventional design of an internal combustion engine.

BRIEF DESCRIPTION OF THE DRAWINGS

The following diagrams illustrate an embodiment of the invention. It is to be understood that the invention is not limited to the precise arrangement and proportions shown herein.

FIGS. 2 trough 9 inclusive are views similar to that of FIG. 1, but at different moments throughout the four strokes of the operating cycle of the invention.

FIGS. 12 (Detail D2 of FIG.1.) and 13 ( Detail D1 of FIG.1.) illustrate the labyrinth which comprises the running and stationary longitudinal seals and prevents leakage of compressed gases.

FIG. 14 (Detail D3 of FIG. 10.) illustrates the labyrinth which prevents leakage of compressed gases along the outer rotor.

FIG. 15 is the junction between the longitudinal stationary seal and the ring seal.

DESCRIPTION OF THE PREFERRED EMBODIMENTS

Figure 1:
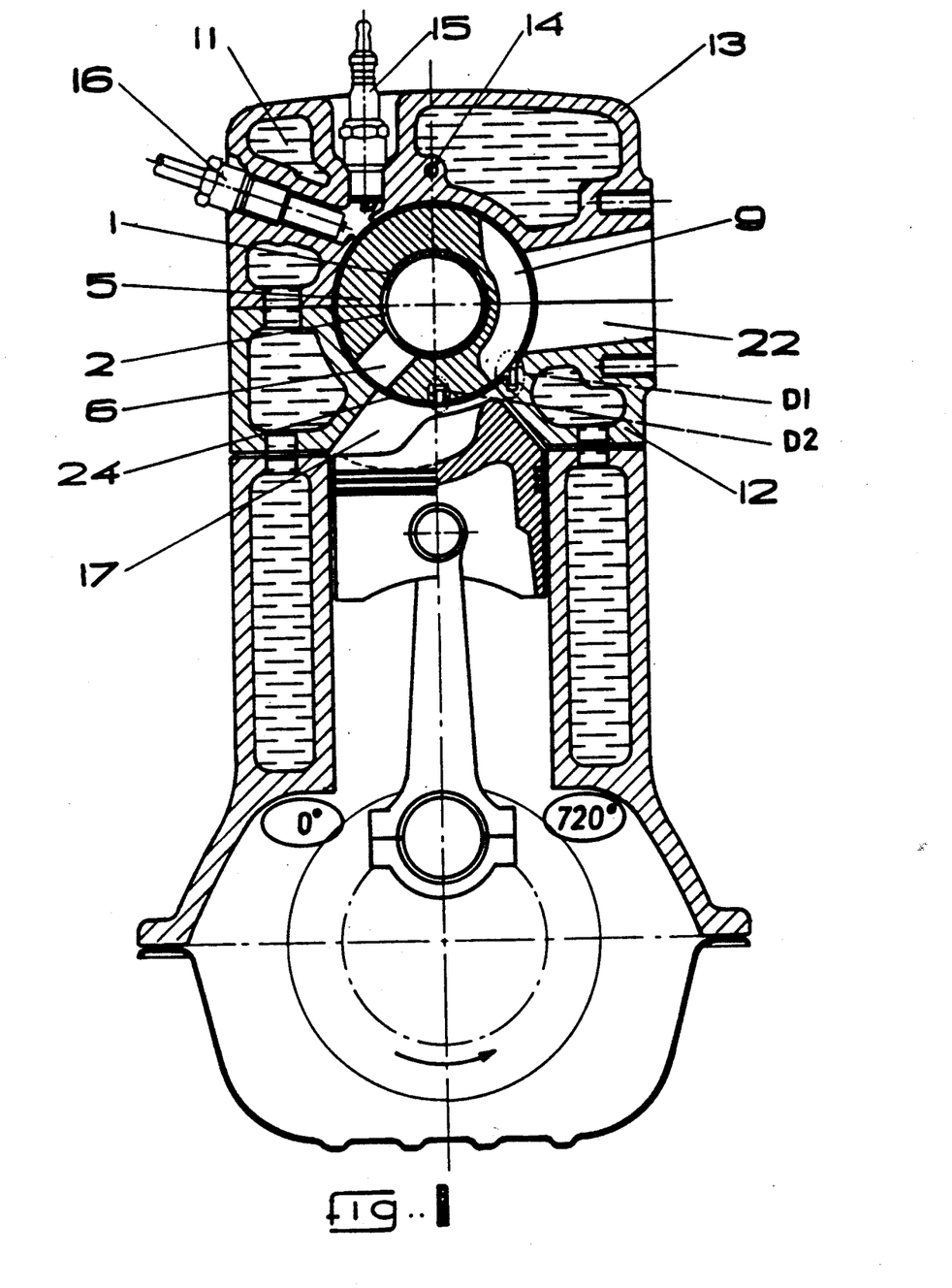
FIG. 1 is a perpendicular sectional view of one cylinder of an internal combustion engine with the coaxial rotary valve type cylinder head and with a stratified combustion pre-combustion chamber according to the invention. The piston is shown at the beginning of the intake stroke.

Referring to the drawings, and more particularly to FIG. 1, it is seen that the supply of fresh air into the cylinder chamber is provided centrally through the inner rotor (1) and its circumferential opening or port (2) when said port is aligned with the cylinder port(6) in the outer rotor (5).

The inner rotor rotates at the same radial speed as the crankshaft, and the outer rotor at one-half of that speed.

The ports therefore coincide once every 720° of rotation of the crankshaft. Although the leading surface and trailing surface of the outer rotor port (6) are parallel, the difference in radial speed between the inner and outer rotor produces a gradual change in the effective port area during opening or closing. It is to be understood that the shape of these ports and their respective positions may be altered without affecting the basic aspects of the preferred embodiment. Nevertheless, the changes in these parameters would affect overall performance of the proposed design, a domain beyond the scope of this application.

Figures 2, 3:
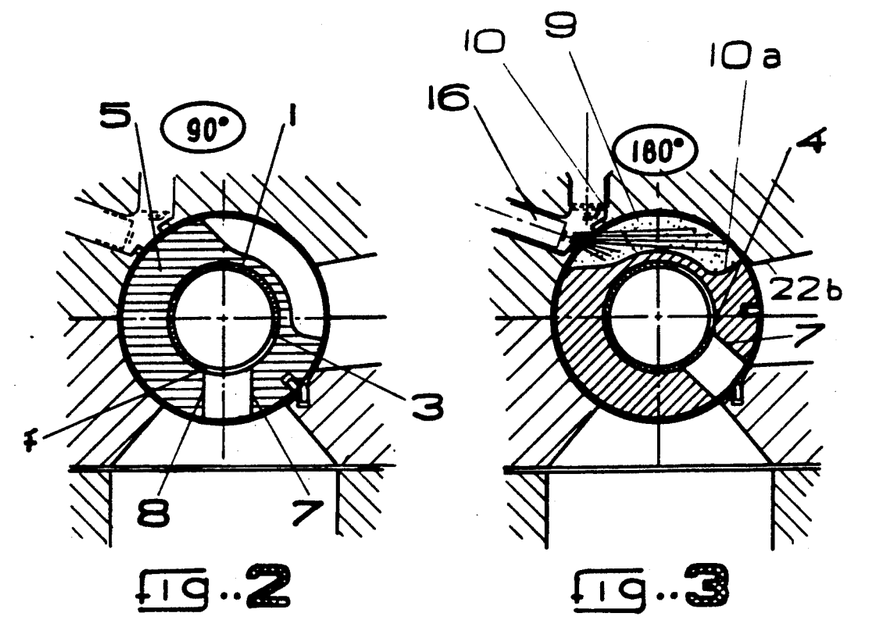

Continuing now to FIG. 2 up to 9 inclusive, the basic operation of the engine is shown throughout one complete cycle.

FIG.2 90 degrees. After the crankshaft rotates for 90° towards Bottom Dead Centre, the trailing edge (4) of the inner rotor (1) opening coincides with the trailing surface (8) of the outer rotor (5) opening. The entire intake port, which they form, is in full open registry with the cylinder chamber.

FIG.3 180 degrees. As the piston reaches Bottom Dead Centre, the trailing edge (4) of the inner rotor coincides with the leading surface of the outer rotor (7), thus closing off communication between the intake manifold and the cylinder chamber. The compression stroke now begins. The trailing surface (10a) of the recess (10) passes the exhaust port edge (22b) and thus forms the pre-combustion chamber (9). At this point of the cycle fuel injection into the pre-combustion chamber (9) starts.

Figure 4:
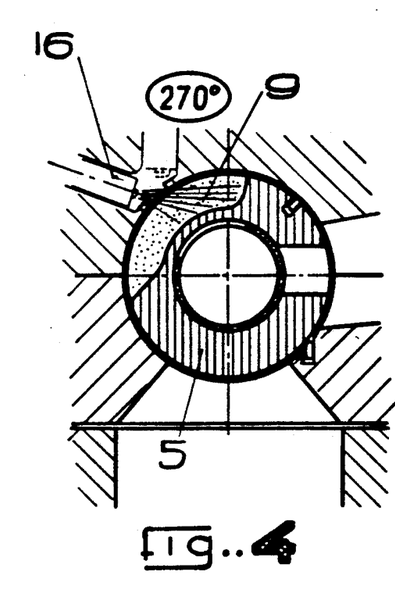

FIG.4 270 degrees. At this point of the cycle, the cylinder chamber is sealed off by the outer rotor (5), while the recess (10 FIG.3.) situated in the outer rotor forms said pre-combustion chamber (9) with the cylinder head. The fuel is injected trough injector (16), and the process continues through this part of the engine cycle.

Figure 5:
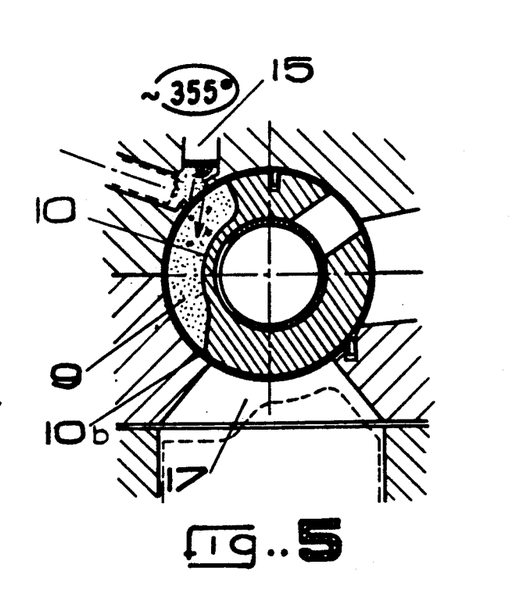

FIG.5 355 degrees. Ignition takes place a few degrees before the piston reaches Top Dead Centre, as illustrated. However, prior to ignition, compressed air is forced from the main-chamber (17) into the pre-combustion chamber (9) through the passage (10b) in the leading surface of the recess (10). This air creates a vortex which homogenizes the combustible mixture prior to ignition.

Figure 6:
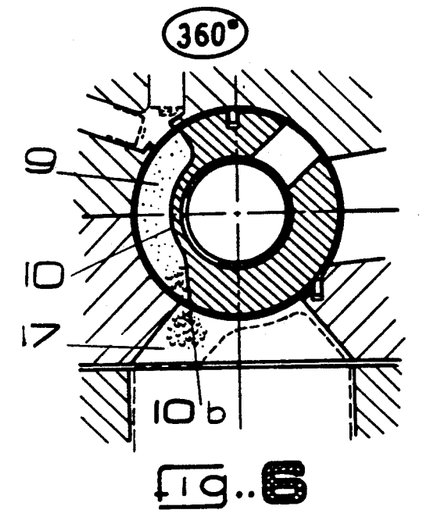

FIG.6 360 degrees. Ignition creates a flame front which propagates in the direction of rotation of the rotary valve system. The flame front propagates through the pre-combustion chamber (9) while the leading surface (10b), of the recess (10) in the outer rotor (5), reaches the main-chamber (17). This lowers the pressure in the pre-combustion chamber (9) and thereby provides a long duration burn of the air/fuel mixture.

Figure 7:
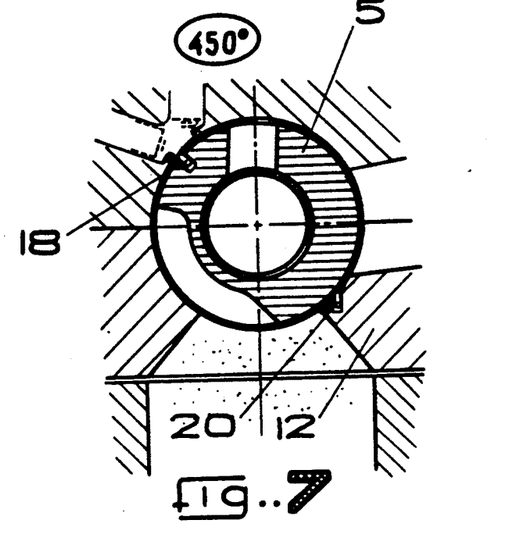

FIG.7 450 degrees. As the piston proceeds through the power stroke, the leakage of pressurized burning gases is prevented by the running seal (18) on the outer rotor (5) and the stationary seal (20) in the bottom housing body (12).

Figure 8:
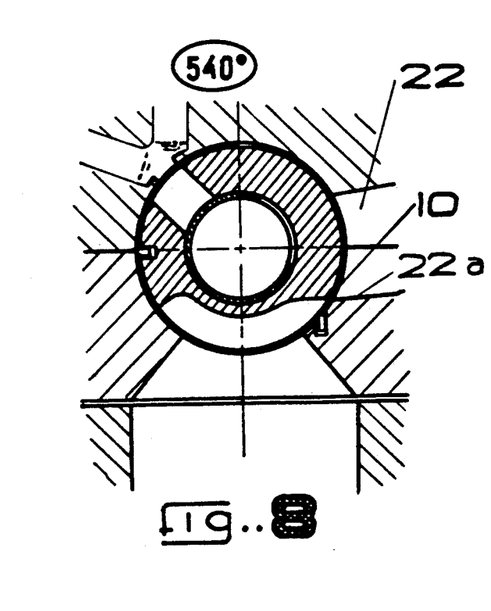

FIG.8 540 degrees. After the piston passes Bottom Dead Centre the exhaust stroke commences, with the leading surface of the recess (10b) coinciding with the exhaust port edge (22a). This brings the cylinder chamber into open registry with the exhaust port (22).

Figure 9:
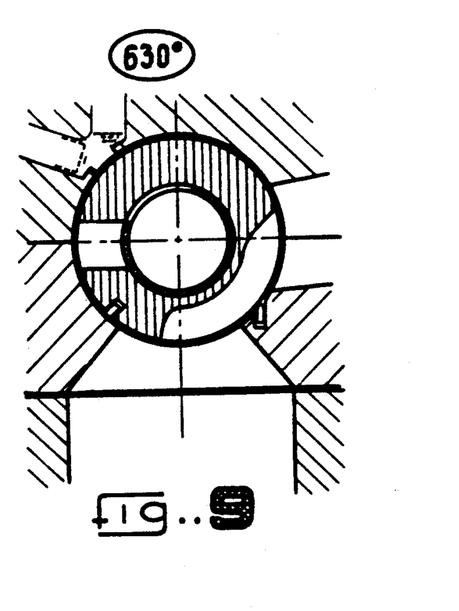

FIG.9 630 degrees. Finally, the open registry between the cylinder chamber and the exhaust port is maintained throughout the exhaust stroke from 540° to 720°. This latter angular position is the same position as in FIG. 1. This completes the operating cycle of the engine.

Figure 10:
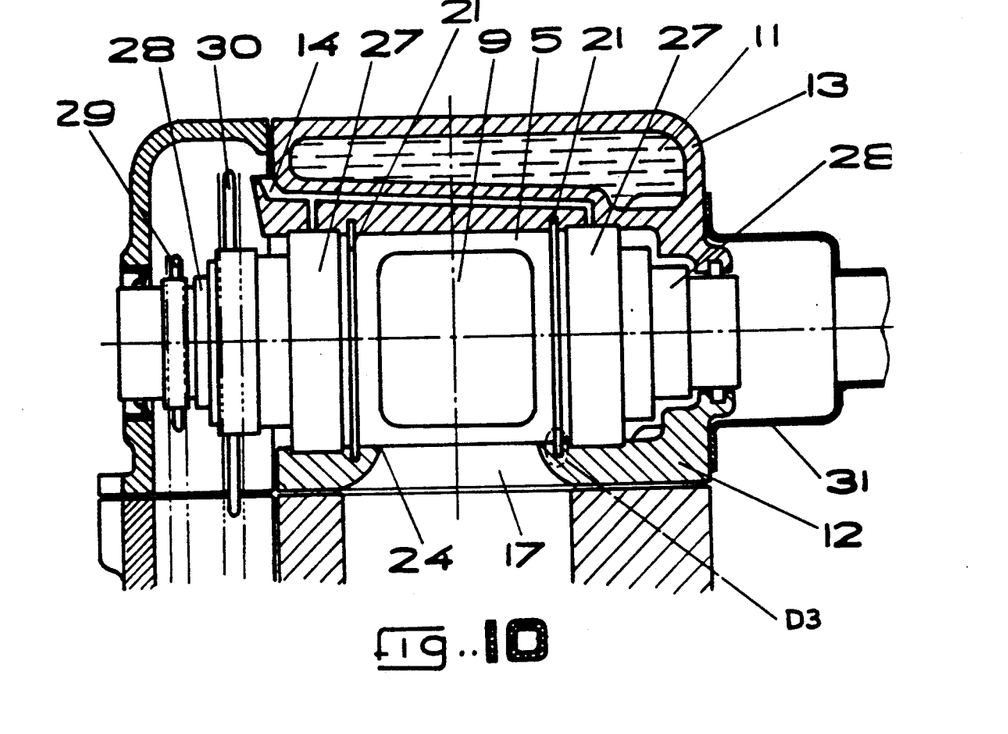
FIG. 10 is a longitudinal sectional view of an internal combustion engine with the outer and inner rotors and showing positions of the bearings, ring seals, rotors, drive gears, oil supply and air intake according to the invention.
Figure 11:
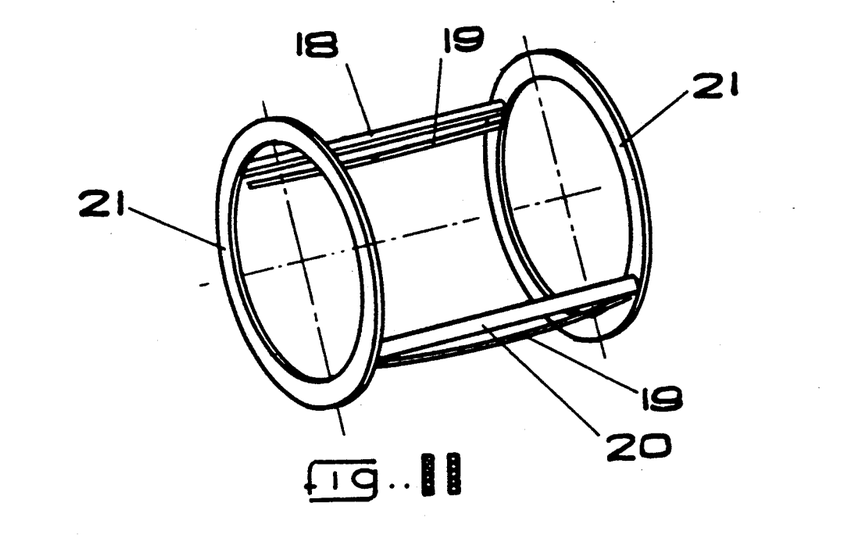
FIG. 11 shows the seal grid assembly in an exploded perspective view with other parts removed.

As shown in FIGS.1 and 10, the outer rotor (5) fits within the bottom housing (12) and top housing (13) with a slight clearance, so that the outer rotor (5) and the housings do not touch each other. Therefore, some means of seal is required.

Referring now to FIGS.11 through 15 inclusive, the seal is achieved by means of a seal assembly which comprises two ring seals (21) and two longitudinal seals (18 and 20).

Figures 12, 13, 14, 15:
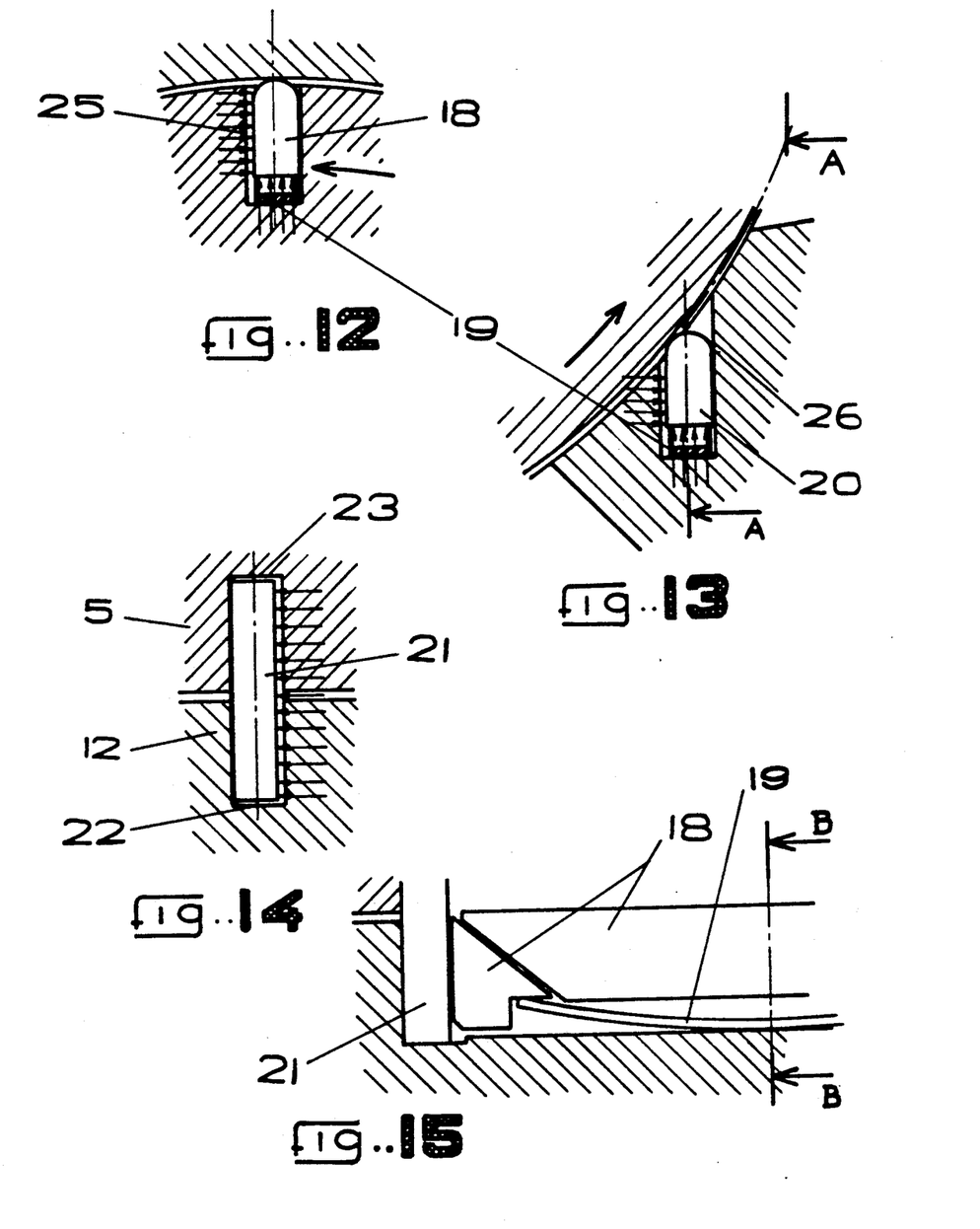

FIG.12 and 13 illustrates by parallel arrows pressurized gases which are prevented from the escape around the circumference of the outer rotor (5) by means of two longitudinal seals. One, a running seal (18), is situated in a slot (25) on the outer rotor (5) and between the recess (9) and the outer rotor port (6). A second seal, a stationary seal (20), is situated in a slot (26) on the exhaust side of the cylinder communication port (24). Sealing contact must be maintained regardless of any possible unfavourable surface conditions or dynamic influences. Therefore, the slots are of such dimensions as to allow the gases to build sufficient pressure to ensure adequate forces on the seals for satisfactory sealing contact. But, sealing is required during initial conditions, and this is ensured by the use of springs (19) behind the longitudinal seals (18 and 20). Good primary contact between the sealing surfaces is thereby ensured.

FIG.14 Two ring seals (21), only one shown, are positioned circumferentially around the outer rotor (5), and are situated in the outer rotor grove (23) and in the rotor housing grove (22), on each side of the cylinder communication port (24 in FIG.10). These ring seals form a labyrinth which prevents the escape of pressurized gases from the cylinder chamber laterally along the surface of the rotor (5).

FIG.15 is section A—A of FIG. 13.

Figure 16:
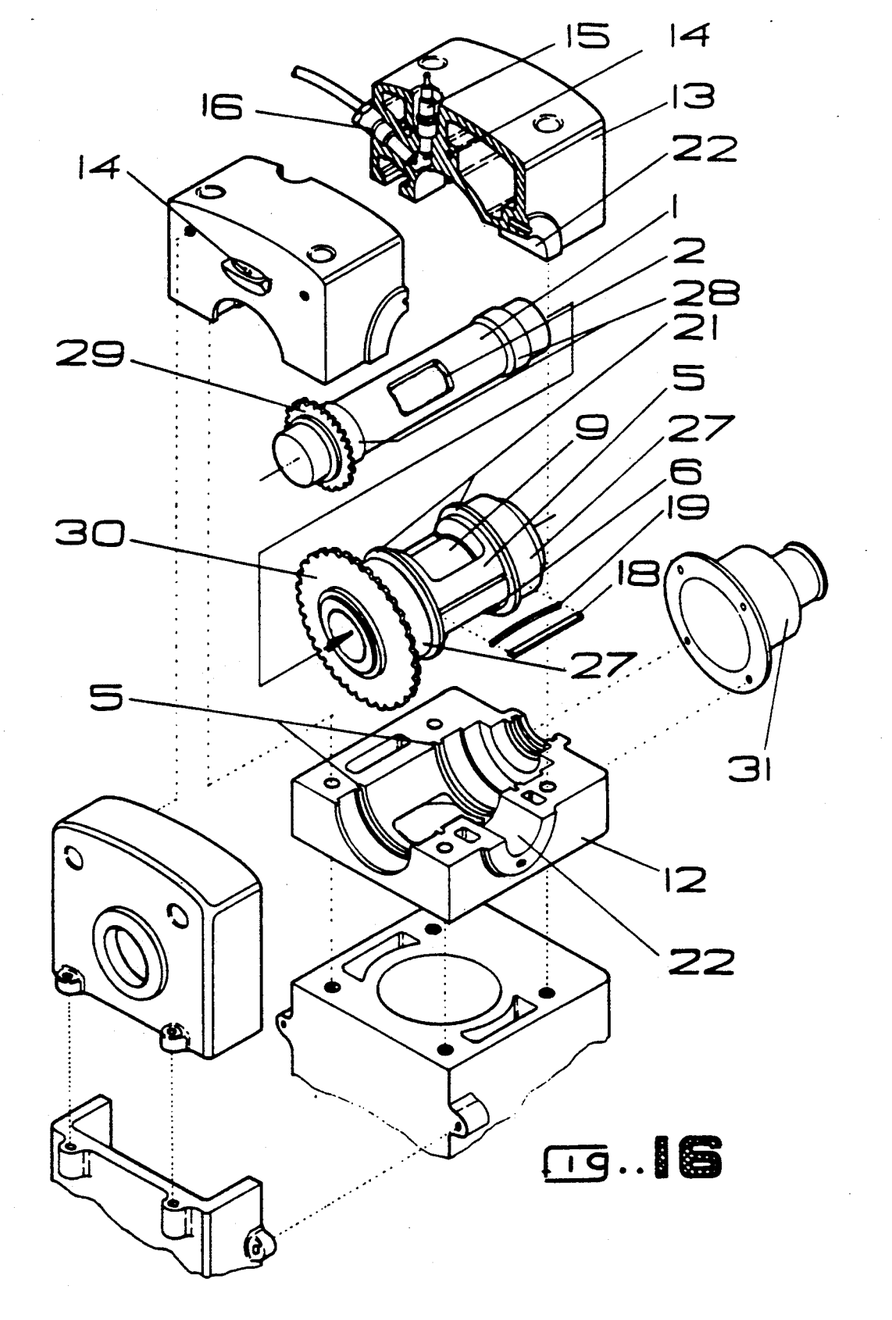
FIG. 16 is a perspective, exploded and partially sectional view of the cylinder head casting with all accompanying parts.

FIG.16 As shown in perspective, the injection nozzle (16) and the spark plug (15) are in a plane perpendicular to the rotational axis of the rotary valve. The positioning is such that an adequate cooling passage may be provided between them. The injector nozzle is inclined so that the fuel may impinge most efficiently upon the surface of the recess.

In addition, not shown here, the positions of the injector and the spark plug may change places to accommodate different performance requirements. But regardless of their relative positions, ignition is initiated in the pre-combustion chamber prior to the moment when the leading surface (10b) of the recess reaches the cylinder communication port.

It would be apparent, to those skilled in the art, that various changes and modifications may be made in the structure, illustrated and described, without departing from the intent and scope of the invention.

We claim:

1. In an internal combustion engine, having at least one cylinder chamber, and an injection and ignition means per cylinder for supplying the fuel and providing positive ignition of the same, the improvement which comprises a rotary valve system situated within the cylinder head of said engine and rotating about, the longitudinal axis of said engine, said rotary valve system comprises two cylindrical rotors, in a coaxial geometry adapted to supply air into said cylinder chamber through the center of the inner rotor and via inlet ports therein, when they are aligned with the outer rotor inlet ports at the appropriate segment of the operating cycle of said engine, and to exhaust burned gases out of said cylinder chamber via a recess on the outer rotor, and means to drive said rotors, with the ratio of the angular velocity of 2:1, so that said outer rotor rotates at the angular velocity which is one-half the engine angular velocity and said inner rotor rotates at same angular velocity as the engine crankshaft.

2. In an internal combustion engine as defined in claim 1, the improvement which comprises a cylinder head for said engine so adapted as to accommodate said rotary valve system, the intake and exhaust ports therein, means for cooling said cylinder head and said injection and ignition means.

3. In an internal combustion engine as defined in claim 1, the improvement which comprises a recess on said outer rotor body that extends circumferentially at an angle, and with a depth sufficient for the achievement of pre-combustion chamber functions and of the exhaust functions, and wherein the leading surface of said recess is so adapted as to allow air into said recess prior to the ignition and to project the burning air/fuel mixture into the main combustion chamber.

4. In an internal combustion engine as defined in claim 1, wherein the injection nozzle of said injection means is disposed at such an angle as to ensure the maximum exposure of the recess surface to injected fuel, and wherein said ignition means is located adjacent to said injection nozzle an the electrodes of said ignition means are at the periphery of the fuel jet.

* * * * *